Nov. 27, 1945. W. H. GABELER 2,389,973
APPARATUS AND METHOD FOR WASHING GELS
Filed Sept. 14, 1943 2 Sheets-Sheet 1

Inventor
WILLIAM H GABELER

Nov. 27, 1945. W. H. GABELER 2,389,973
APPARATUS AND METHOD FOR WASHING GELS
Filed Sept. 14, 1943 2 Sheets-Sheet 2

Inventor
WILLIAM H GABELER

Patented Nov. 27, 1945

2,389,973

UNITED STATES PATENT OFFICE 2,389,973

APPARATUS AND METHOD FOR WASHING GELS

William H. Gabeler, Baltimore, Md., assignor to The Davison Chemical Corporation, Baltimore, Md.

Application September 14, 1943, Serial No. 502,348

8 Claims. (Cl. 23—182)

The present invention relates to the washing of inorganic gels and more particularly has reference to an apparatus in which the washing is effected.

In the preparation of inorganic gels, such as silica gel, a reaction is generally carried out between a substance containing a gel forming constituent, such as sodium silicate, and a reagent, such as sulphuric acid, capable of reacting with the sodium silicate to form a silica hydrosol containing sodium sulphate. The so formed hydrosol containing the undesired reaction products is allowed to set into a hydrogel and the latter is washed to remove the undesired soluble reaction products therefrom. Other methods of preparing silica and other inorganic gels are employed for forming gels containing various quantities of impurities which may be washed out with a suitable washing medium. One of the general procedures involved in the washing of the hydrogel and other gel forms in accordance with the prior art resides in the immersion of the gel in a washing medium. Varying degrees of success are obtained with this prior method and in many cases the results are unsatisfactory. One disadvantage of the prior art methods is the loss due to the handling of the gel which in the washing stage is very fragile. Due to the fragility of the gel, a large quantity of very fine gel particles are obtained even in instances where larger size particles are desirable.

An object of this invention is to provide an apparatus in which inorganic gels may be washed in a manner which will avoid the disadvantages of the prior art.

Another object of this invention is to provide an apparatus in which inorganic gels may be washed with a minimum amount of damage to the gel.

Still another object of this invention is to provide an apparatus consisting of a plurality of trays for supporting the gel in thin layers for the passage of a washing medium through the layers.

A still further object of this invention is to provide an apparatus comprising a plurality of interconnectible chambers in which stacks of trays having foraminous bottoms may be arranged for supporting the gel in a plurality of thin layers while flowing a washing medium therethrough.

With these and other objects in view, the present invention resides in the parts and combinations hereinafter set forth and illustrated in the drawings.

Figure 1:
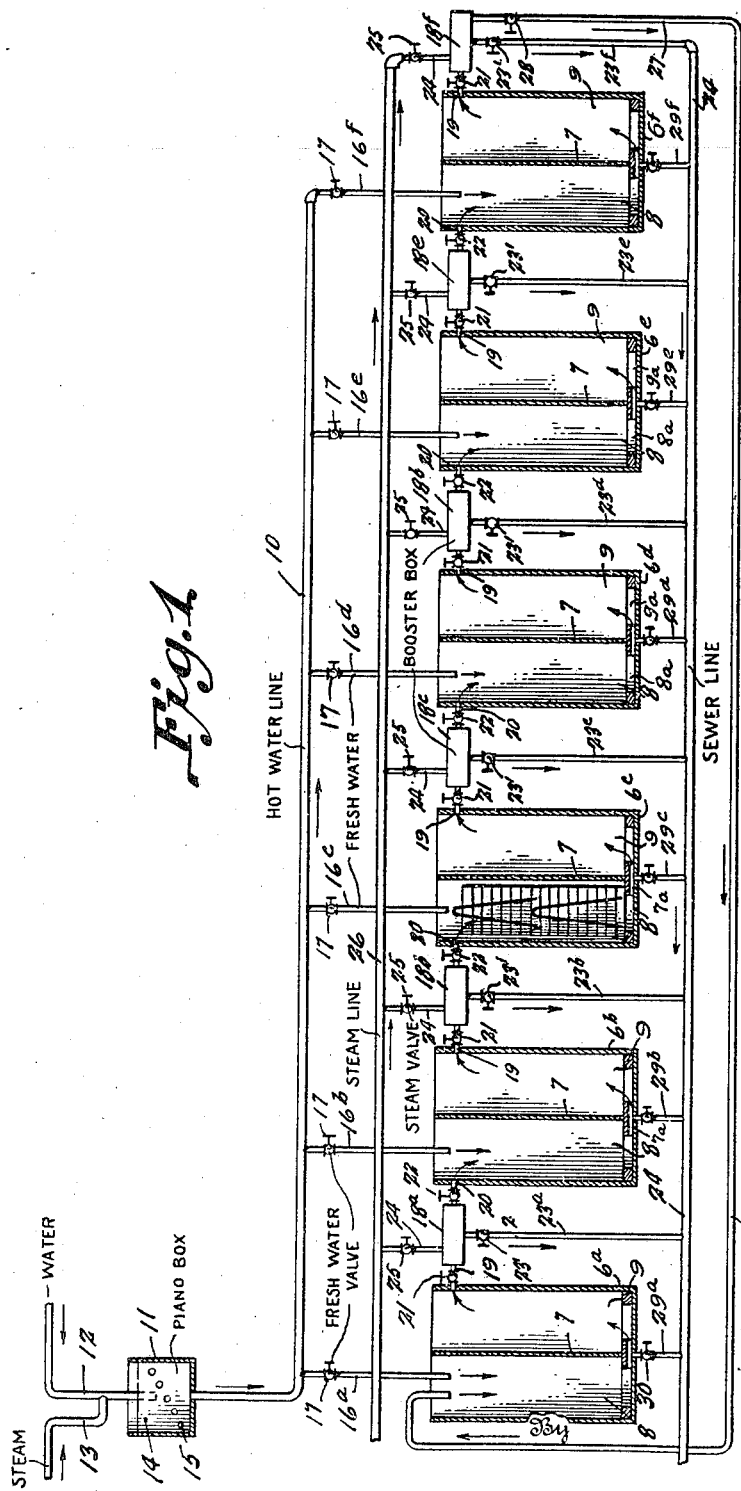
Figure 1 is a somewhat diagrammatical sectional view of a washing apparatus constructed in accordance with the present invention.

An inorganic gel may be washed in accordance with the present invention regardless of its method of manufacture. The present invention, however, is especially suitable for the washing of a hydrogel which has been broken into lumps or fragments which will pass through a screen having approximately 3-inch mesh. In my application Serial No. 473,243, filed January 22, 1943, there is disclosed a method of loading gel, which has set in a small tub, into trays of the type employed in carrying out the present invention. In the prior application, trays similar to trays 1 shown in the drawings of the present application are positioned beneath a grating or screen through which large masses of the gel to be loaded into the trays are passed. After the gel is deposited in the tray, it may be spread in a thin layer on the tray by a rake or other suitable means.

For purposes of convenience, the trays 1 which are of substantially rectangular shape are provided with a foraminous bottom 2 which is suitably secured to the side walls of the tray. The trays are preferably constructed of wood or other suitable material which is unaffected by the acid which is usually present in the gel and in the washing medium employed in washing the gel.

Figure 2:
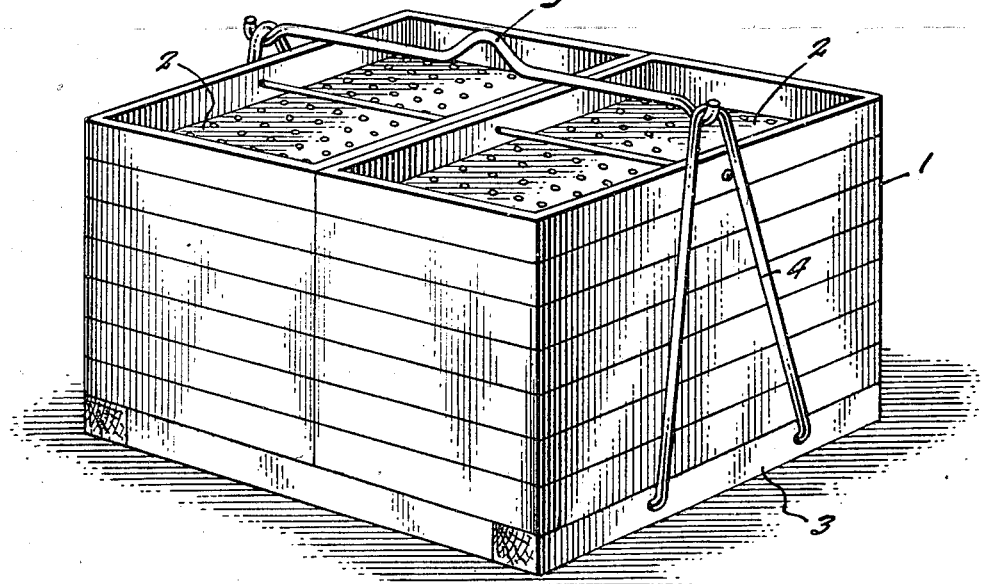
Figure 2 is a perspective view of a stack of washing trays having foraminous bottoms on which thin layers of gel may be arranged for washing.
Figure 3:
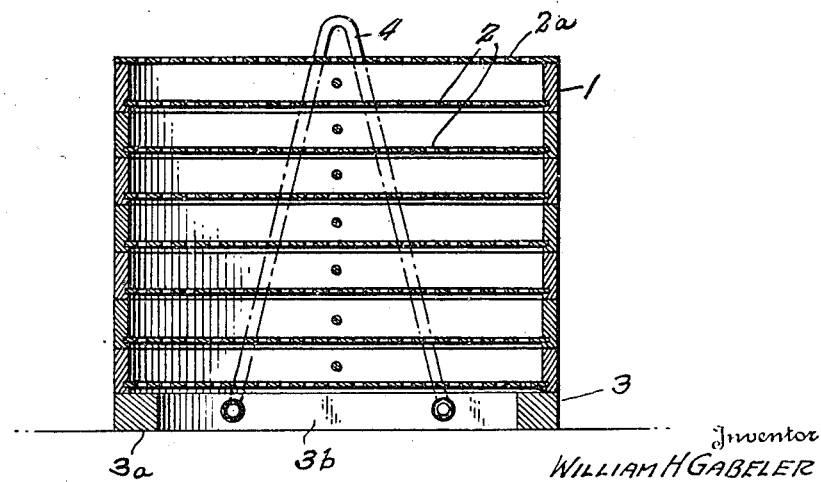
Figure 3 is a vertical sectional view of a stack of trays shown in Figure 2.

A plurality of the trays 1 containing the gel to be washed are stacked as illustrated in Figures 2 and 3 of the drawings onto racks 3. The racks comprise a rectangular frame-like platform 3a having lifting bars or loops 4 extending upwardly therefrom with which a lifting yoke 5 may be associated for hoisting the rack and the stacks of trays mounted thereon. For purposes of convenience, the trays are constructed in the form of oblongs of such proportions that two stacks of trays 1 can be arranged on the rack 3. In some instances, the trays 1 and the platform 3a may be of the same length and width so that only one stack of trays is received by the platform 3a.

After the trays are stacked on the rack 3, as illustrated in Figure 2, a suitable hoisting mechanism may be employed to lift the rack and the trays thereon containing the gel to be washed and lower the same into a series of washing chambers or tanks 6a, 6b, 6c, 6d, 6e and 6f, as illustrated in Figure 1 of the drawings. The chambers or tanks 6 may be of wooden construction and lined with lead or other suitable acid resisting material. It has been found desirable to provide a partition 7 extending from the upper portion of the chamber or tank 6 to a point spaced from the bottom thereof, thereby dividing the chamber into two washing compartments 8 and 9. Each of the washing compartments 8 and 9 is so dimensioned as to snugly receive one or more racks 3 containing stacks of trays 1. For purposes of illustration, two stacks of trays have been shown in one of the compartments 8 in the drawings but it is to be understood that the wash tanks may be made of any desired depth to accommodate either one, two or more stacks of trays.

As shown in Figure 1, each compartment 8 of each tank is provided with a sump or pit 8a in the bottom thereof which communicates through a duct 7a with a similar sump or pit 9a in the other compartment 9 of the same tank. The portion of the bottom of the tank compartments surrounding the sumps 8a and 9a are so dimensioned as to receive the platforms 3a of the tray racks with the opening 3b in the platform of the racks registering with the sump.

Since the dimensions of the platforms 3a correspond to the dimensions of the trays stacked thereon, a platform may be fitted on top of the uppermost trays of a stack.

When the racks containing the stacks of trays are positioned in the compartments, a conduit-like structure is provided which registers with the sump or pit in the bottom of the compartments, the outer walls of the trays and the platforms of the several racks serving as conduit walls. With this construction, flow of wash water through the gel in the stacked trays is insured.

On the uppermost tray of the upper stack, a perforated cover plate 2a is fitted and secured if necessary by suitable means (not shown) to prevent the gel from being carried out of this tray.

It will be noted from Figure 1 of the drawings that the series of six wash tanks are interconnected. For purposes of supplying fresh washing medium, such as water, to each of the tanks, there is provided a supply conduit 10 designated "hot water line" in the drawings. This line is supplied with fresh washing medium from a so-called piano box 11 into which a mixture of water and steam suitably proportioned to obtain a desired temperature is introduced. The water may be introduced into the piano box through a supply conduit 12 and mixed with steam supplied through a conduit 13. Suitable valves not shown are provided in each of the conduits 12 and 13 for proportioning and controlling the supply of water and steam to the piano box.

The so-called piano box 11 is provided with a partition 14 dividing the inlet side of the box from the outlet side thereof. This partition is provided with a series of orifices 15 arranged at various levels throughout the box. This device serves to indicate the amount of washing medium flowing through the box into the washing system. The operator merely has to glance at the partition 14 and ascertain the number of openings through which the liquid is flowing to determine the rate of flow of the washing medium into the system. A plurality of branch conduits 16a, 16b, etc., provided with valves 17, extend from the hot water line 10 to each of the wash tanks 6.

Between adjacent tanks 6, there are provided a plurality of booster boxes 18a, 18b, etc., which are connected by conduits 19 and 20 provided with valves 21 and 22, respectively, with the wash tanks. The booster boxes are each provided with a drain line 23a, 23b, etc., which connects with a sewer line 24 common to all of the wash tanks. Each of the drain lines is provided with a control valve. The discharge of liquid from the booster boxes through the drain lines 23 may be controlled by plugs which may be inserted into the drain lines 23 to prevent the flow therethrough or by the provision of valves 23' in said lines. Each of the booster boxes has communicating therewith a branch steam pipe 24 which is provided with a valve 25 for controlling the supply of steam from a steam line 26 to the respective booster boxes.

The booster box at the extreme righthand portion of Figure 1 is connected by a conduit 27 provided with a valve 28 to the tank 6a shown at the extreme lefthand portion of Figure 1.

In addition to the drain connections 23 from the booster boxes, each of the wash tanks is provided with a drain 29a, 29b, 29c, 29d, 29e and 29f, each provided with a valve 30 whereby any liquid in the tanks may be discharged to the sewer line.

With the construction illustrated, each of the wash tanks 6a, 6b, 6c, 6d, 6e and 6f may be connected in series through the booster boxes and the communicating conduits 19 and 20. In addition, the tanks 6a and 6f may be serially connected through the conduit 27 so that all of said wash tanks may be connected in a substantially closed circuit if desired.

In utilizing the apparatus illustrated in Figure 1 for carrying out the present invention, the racks 3 containing the stacks of trays 1 filled with thin layers of the gel to be washed are placed in the several compartments 8 and 9 of each of the wash tanks 6a, 6b, 6c, 6d, 6e and 6f. At the initial utilization of the apparatus, it may be preferable to first fill one of the tanks such as 6f and then start the introduction of the washing medium into said tank through the appropriate branch conduit 16. For this purpose, the water supplied through conduit 12 which may be controlled as to its pH value has steam supplied through the conduit 13 mixed therewith to bring it to the desired temperature. The flow of water and steam through the conduits 12 and 13 are so controlled as to obtain the desired rate of flow. As indicated by the arrows in the drawings, the washing medium introduced into tank 6f, for instance, will fill said tank and eventually reach the level of the conduit 19 from which the liquid will flow into the booster box 18f illustrated on the right of said tank. When only one tank is in operation as, for instance, tank 6f, the washing medium discharged into the booster box from tank 6f may be run into the sewer line through the drain 23f.

If the tank 6f is the first one loaded with the gel to be washed, the next tank to be loaded would be tank 6a. In this instance, after the tank 6a is loaded with the racks of trays containing the gel, the valve 28 would be opened and the valve 23' of the booster box 18f to the right of tank 6f would be closed. With the valves 23' of conduit 23f and 28 in the positions above referred to, the wash liquid discharged from the tank 6f would flow into the associated booster box 18f in which it would be heated by steam supplied through the branch conduit 24 and would then flow through the line 27 to the intake compartment 8 of the tank 6a. After the tank 6a is filled with the wash liquid, the liquid would overflow from tank 6a through the conduit 19 into the associated booster box 18a from which it would be discharged through the associated drain pipe 23a to the sewer line.

The loading of the racks containing the trays of gel into the tanks is effected successively until all of the tanks are filled with racks of trays containing gel to be washed. The circulation of the washing medium successively from one tank to the other of the series is continued until the gel in the first loaded tank has been washed to the desired extent. When this has been accomplished, assuming that tank 6f was the first tank loaded, the valve 17 of the conduit 16f associated with tank 6f would be closed and the valve 17 of the conduit 16a associated with tank 6a would be opened. Thus, the supply of fresh washing liquid would be shifted from tank 6f to tank 6a. The liquid contained in the tank 6f could then be drained through the drain conduit 29f into the sewer line and the racks of trays containing the washed gel could be removed. After removal of the washed gel, further racks containing trays of unwashed gel could be introduced into the tank and in this instance the washing medium from the tank last loaded instead of being discharged into the sewer could then be introduced into the newly loaded tank.

From the foregoing, it will be appreciated that a more or less continuous washing system is provided. Preferably, the first loaded tank of the tanks in the circuits is supplied with the fresh wash medium and the last loaded tank receives the washing medium after passing serially through the previously loaded tanks and the wash medium discharged from the last loaded tank is sent to the sewer.

By providing for the introduction of steam into the booster boxes, the temperature of the washing medium supplied to the several wash tanks can be controlled fairly accurately. For purposes of convenience, the wash tanks have been divided by the partitions 7 into two compartments 8 and 9, the washing medium flowing downwardly through the compartment 8 and upwardly through the compartment 9. This direction of flow is of course not critical and the flow of the washing medium through the tanks may be in any desired direction. Furthermore, if desired, the wash tanks may be constructed so that the washing medium is introduced either at the top or the bottom and withdrawn from either the top or the bottom, as the case may be.

The arrangement of the wash tanks in a substantially closed circuit enables the washing of the gel in stages to be carried out on a substantially countercurrent principle. In other words, in effect, the washing medium moves countercurrently to the portions or stages of gel undergoing washing so that the portion of gel which is most nearly washed will be subjected to the fresh washing medium.

By arranging the trays in stacks on the specially constructed rack platforms and placing the latter in register with the wells in the bottoms of the tank compartments, the stacked trays and rack platforms cooperate to form a closed conduit in which the gel is supported and through which the washing medium is passed.

In some instances, it is desirable to control the pH value of the washing medium. This control may be effected in any desired manner, a suitable acid being added to the fresh washing medium to maintain a predetermined pH value.

The apparatus herein described has proven to be satisfactory in that gel may be washed in a minimum time most effectively and with a minimum loss in the gel by reason of the lack of damage and breakage of the gel fragments which occur during the washing of gel in apparatus according to the prior art.

I claim:

1. A gel washing apparatus comprising a tank, a vertical partition dividing the tank into two compartments, a plurality of trays in each compartment, said trays having imperforate side walls and foraminous gel supporting bottoms and being arranged in assembled vertical stacks with the bottoms horizontal and the side walls of the several trays cooperating to form a continuous vertical tubular wall from the bottom to the top of the stack, means in the bottom of each compartment spacing the lowermost tray of each stack from the bottom of the compartment and providing sides enclosing the space between the lowermost tray of the stack and the bottom of the compartment, a duct placing the enclosed space between the lowermost tray of the stack and the bottom of the compartment of one compartment in communication with the corresponding space in the other compartment, a wash liquid supply inlet in the upper portion of one compartment above the uppermost tray in the stack therein, and a wash liquid outlet in the upper portion of the other compartment above the uppermost tray of the stack therein whereby wash liquid will flow from the inlet down through the stack of trays in one compartment into the aforesaid space at the bottom thereof, through said duct into the corresponding space in the other compartment, and up through the stacked trays therein to said outlet.

2. A gel washing apparatus comprising a tank, a vertical partition dividing the tank into two compartments, each compartment having a sump centrally positioned in the bottom thereof, a duct placing the sump of one compartment in communication with the sump of the other compartment, a plurality of trays in each compartment, said trays having imperforate side walls and foraminous gel supporting bottoms and being arranged in assembled vertical stacks with the bottoms horizontal and the side walls of the several trays cooperating to form a continuous vertical tubular wall from the bottom to the top of the stack, said stack of trays being positioned in said compartment with the side walls of the lowermost tray cooperating with the bottom of the compartment surrounding said sump to place the interior of said stack of trays in communication with the sump, a wash liquid supply inlet in the upper portion of one compartment above the uppermost tray in the stack therein, and a wash liquid outlet in the upper portion of the other compartment above the uppermost tray of the stack therein whereby wash liquid will flow from the inlet down through the stack of trays in one compartment into the sump in said compartment through said duct into the sump of the other compartment, and up through the stacked trays in said other compartment to said outlet.

3. A gel washing apparatus comprising a tank, a vertical partition dividing the tank into two compartments, each compartment having a sump centrally positioned in the bottom thereof, a duct placing the sump of one compartment in communication with the sump of the other compartment, a plurality of trays in each compartment, said trays having imperforate side walls and foraminous gel supporting bottoms and being arranged in assembled vertical stacks with the bottoms horizontal and the side walls of the several trays cooperating to form a continuous vertical tubular wall from the bottom to the top of the stack, a tray stack supporting frame having a large central opening surrounded by a continuous peripheral supporting wall in each compartment between the lowermost tray of the stack and the bottom of the compartment with the central opening in register with the sump and in register with the interior of the continuous tubular wall formed by the stack of trays to connect the interior of the stack of trays with said sump, a wash liquid supply inlet in the upper portion of one compartment above the uppermost tray in the stack therein, and a wash liquid outlet in the upper portion of the other compartment above the uppermost tray of the stack therein whereby wash liquid will flow from the inlet down through the stack of trays in one compartment into the sump in said compartment through said duct into the sump of the other compartment, and up through the stacked trays in said other compartment to said outlet.

4. A gel washing apparatus comprising a plurality of tanks, a vertical partition in each tank dividing the tank into two compartments, a plurality of trays in each compartment, said trays having imperforate side walls and foraminous gel supporting bottoms and being arranged in assembled vertical stacks with the bottoms horizontal and the side walls of the several trays cooperating to form a continuous vertical tubular wall from the bottom to the top of the stack, means in the bottom of each compartment spacing the lowermost tray of each stack from the bottom of the compartment and providing sides enclosing the space between the lowermost tray of the stack and the bottom of the compartment, a duct placing the enclosed space between the lowermost tray of the stack and the bottom of the compartment of one compartment in communication with the corresponding space in the other compartment, a wash liquid supply inlet in the upper portion of one compartment above the uppermost tray in the stack therein, and a wash liquid outlet in the upper portion of the other compartment above the uppermost tray of the stack therein whereby wash liquid will flow from the inlet down through the stack of trays in one compartment into the aforesaid space at the bottom thereof, through said duct into the corresponding space in the other compartment, and up through the stacked trays therein to said outlet, and conduits connecting the wash liquid outlet of one tank to the wash liquid inlet of an adjacent tank to effect a serial flow of wash liquid down through one compartment and up through the other compartment of each tank and from the upflow compartment of one tank to the downflow compartment of the adjacent tank.

5. A gel washing apparatus comprising a plurality of tanks, a vertical partition in each tank dividing the tank into two compartments, a plurality of trays in each compartment, said trays having imperforate side walls and foraminous gel supporting bottoms and being arranged in assembled vertical stacks with the bottoms horizontal and the side walls of the several trays cooperating to form a continuous vertical tubular wall from the bottom to the top of the stack, means in the bottom of each compartment spacing the lowermost tray of each stack from the bottom of the compartment and providing sides enclosing the space between the lowermost tray of the stack and the bottom of the compartment, a duct placing the enclosed space between the lowermost tray of the stack and the bottom of the compartment of one compartment in communication with the corresponding space in the other compartment, a wash liquid supply inlet in the upper portion of one compartment above the uppermost tray in the stack therein, and a wash liquid outlet in the upper portion of the other compartment above the uppermost tray of the stack therein whereby wash liquid will flow from the inlet down through the stack of trays in one compartment into the aforesaid space at the bottom thereof, through said duct into the corresponding space in the other compartment, and up through the stacked trays therein to said outlet, and conduits connecting the wash liquid outlet of one tank to the wash liquid inlet of an adjacent tank to effect a serial flow of wash liquid down through one compartment and up through the other compartment of each tank and from the upflow compartment of one tank to the downflow compartment of the adjacent tank, and means for introducing a heating medium into the wash liquid during flow through the conduits connecting the adjacent tanks.

6. A method of washing inorganic hydrogels comprising spreading the gel on foraminous bottoms of a plurality of trays having imperforate side walls, assembling the plurality of trays in vertical stacks with the side walls of the trays of each stack cooperating to form a continuous tubular conduit, positioning the stacks of trays in a wash tank divided by a vertical partition into a plurality of compartments with the lowermost tray of one stack connected with a sump in the bottom of one compartment and with the lowermost tray of another stack connected with a sump in the bottom of the other compartment, feeding a wash liquid into the upper portion of one compartment above the stack of trays therein down through the stack of trays into the sump connected with the lowermost tray, passing the liquid from the sump of one compartment to the sump of the other compartment and thence up through the stack of trays in the other compartment into the upper portion of the other compartment, and discharging it from said upper portion of said other compartment.

7. A method of washing inorganic hydrogels comprising spreading the gel on foraminous bottoms of a plurality of trays having imperforate side walls, assembling the plurality of trays in vertical stacks with the side walls of the trays of each stack cooperating to form a continuous tubular conduit, positioning the stacks of trays in a plurality of wash tanks, each tank being divided by a vertical partition into a plurality of compartments with the lowermost tray of one stack connected with a sump in the bottom of one compartment and with the lowermost tray of another stack connected with a sump in the bottom of the other compartment, feeding a wash liquid into the upper portion of one compartment of one tank above the stack of trays therein down through the stack of trays into the sump connected with the lowermost tray, passing the liquid from the sump of one compartment to the sump of the other compartment and thence up through the stack of trays in the other compartment into the upper portion of the other compartment, and passing the wash liquid from the upper portion of said other compartment downwardly and upwardly through stacks of trays in the compartments of succeeding wash tanks.

8. A method of washing inorganic hydrogels comprising spreading the gel on foraminous bottoms of a plurality of trays having imperforate side walls, assembling the plurality of trays in vertical stacks with the side walls of the trays of each stack cooperating to form a continuous tubular conduit, positioning the stacks of trays in a plurality of wash tanks, each tank being divided by a vertical partition into a plurality of compartments with the lowermost tray of one stack connected with a sump in the bottom of one compartment and with the lowermost tray of another stack connected with a sump in the bottom of the other compartment, feeding a wash liquid into the upper portion of one compartment of one tank above the stack of trays therein down through the stack of trays into the sump connected with the lowermost tray, passing the liquid from the sump of one compartment to the sump of the other compartment and thence up through the stack of trays in the other compartment into the upper portion of the other compartment, and passing the wash liquid from the upper portion of said other compartment downwardly and upwardly through stacks of trays in the compartments of succeeding wash tanks, and heating the wash liquid while passing it from one tank to a succeeding tank.

WILLIAM H. GABELER.